(12) United States Patent
Tsai et al.

(10) Patent No.: US 7,312,983 B2
(45) Date of Patent: Dec. 25, 2007

(54) EXPANSION SOCKET FOR DIGITAL VIDEO DEVICES

(75) Inventors: Chu-Chia Tsai, Taipei (TW); Chia-Hsien Lee, Taipei (TW); Chun-I Teng, Taipei (TW)

(73) Assignee: Wistron Corporation, Taipei Hsien (TW)

( * ) Notice: Subject to any disclaimer, the term of this patent is extended or adjusted under 35 U.S.C. 154(b) by 472 days.

(21) Appl. No.: 11/102,648

(22) Filed: Apr. 11, 2005

(65) Prior Publication Data

US 2006/0143354 A1 Jun. 29, 2006

(30) Foreign Application Priority Data

Dec. 29, 2004 (TW) ............................... 93221125 U

(51) Int. Cl.
*G06F 1/16* (2006.01)
(52) U.S. Cl. ...................... 361/686; 361/683; 361/684; 361/685; 361/727; 710/62; 710/63; 710/303; 369/75.11
(58) Field of Classification Search ........ 361/683–686, 361/724–727; 710/62, 63, 100–106, 129–131, 710/300–304; 369/75.2, 77.2, 75.11; 360/97.01, 360/97.02; 312/223.1, 223.2, 223.3
See application file for complete search history.

(56) References Cited

U.S. PATENT DOCUMENTS

| | | | | |
|---|---|---|---|---|
| 5,689,400 A | * | 11/1997 | Ohgami et al. | ............. 361/683 |
| 5,801,922 A | * | 9/1998 | Shen et al. | ................. 361/686 |
| 5,999,401 A | * | 12/1999 | Howell et al. | .............. 361/684 |
| 6,375,495 B1 | * | 4/2002 | Szeto | ...................... 439/540.1 |
| 6,456,492 B1 | * | 9/2002 | Wang et al. | ................. 361/686 |
| 6,525,932 B1 | * | 2/2003 | Ohnishi et al. | ............. 361/686 |
| 6,742,070 B2 | * | 5/2004 | Fuchida | ...................... 710/303 |
| 6,898,076 B2 | * | 5/2005 | Pappalardo et al. | ........ 361/683 |
| 7,167,362 B2 | * | 1/2007 | Tseng et al. | ................ 361/686 |

* cited by examiner

*Primary Examiner*—Michael Datskovskiy
(74) *Attorney, Agent, or Firm*—Bacon & Thomas, PLLC

(57) ABSTRACT

This invention provides an expansion socket for a digital video device, which is located under a side of a housing of the digital video device in a laptop. By configuring the expansion socket and the digital video device, it may form a box-like shape. The expansion socket for the digital video device of this invention comprises a socket main body for an expansion module to be inserted into in order to increase the functionality of the laptop.

16 Claims, 6 Drawing Sheets

EXPANSION SOCKET FOR DIGITAL VIDEO DEVICES

BACKGROUND OF THE INVENTION

1. Field of the Invention

The present invention relates to an expansion socket for digital video devices, and more particularly, to an expansion socket for digital video devices that can be used in laptop computers.

2. Description of the Related Art

With increasing amounts of business travel, the need for portable electronic devices has grown accordingly. Light, thin, and small laptop computers, therefore, have developed quickly. Additionally, with today's information technology, the high technology of the Internet is used to link to different information sources, and provides communication with others to more easily obtain information. Thus, people are increasingly relying on portable electronic devices, and in particular they are relying on computers.

When laptops get down to a certain size, however, their prices become very expensive. Furthermore, the small size laptop computers may limit their expandability.

Referring to FIG. 1, conventionally, the digital video device 1 has an irregular outline. In general, housing 10 of the digital video device 1 comprises a disk tray area 12 for placing a disk thereon, and a disk area 14 in which the disk revolves. The disk area 14 is located above the disk tray area 12, and a cross section of the disk area 14 is larger than that of the disk tray area 12 (with reference to the X-Y plane of the coordinate axis). Comparing the disk area 14 with the disk tray area 12, a larger portion 141 and a side 121 of the disk tray area 12 form an irregular space 19. The irregular space 19 is the source of the irregular shape of the outline of the digital video device 1, and usually, the irregular space 19 is a useless space.

The digital video device 1 further comprises a magnetic head, a storage device, a processor, and/or control unit, etc., which are known to those skilled in this art.

For manufacturers of laptop computers, the internal space of the laptop computer is extremely valuable to provide additional functionality. Usually, the internal space of the laptop computer is filled with components, so that if the manufacturer desires to expand the functionality of the laptop computer, it is necessary to provide an external socket. However, when traveling, it is inconvenient for users to bring the various card devices of the external socket.

SUMMARY OF THE INVENTION

The above problems, and especially the problem of irregular space, are big sources of wasted internal space for the manufacturers of laptop computers. Therefore, this invention provides an expansion socket for digital video devices, which comprises a housing covering a digital video main body. The digital video main body has a magnetic head, a storage device, a processor, and/or a controller device, as is well known by those skilled in this art. The housing comprises a disk tray area and a disk area. The disk area is located above the disk tray area, and a cross section of the disk area is larger than that of the disk tray area. The larger area and a side of the disk tray area form an expansion space. In another words, this invention utilizes the irregular space wasted in the prior art to define an expansion space in order to efficiently utilize the internal space of the laptop computer.

Other objects, advantages, and novel features of the invention will become more apparent from the following detailed description when taken in conjunction with the accompanying drawings.

DETAILED DESCRIPTION OF THE PREFERRED EMBODIMENT

The following descriptions of the preferred embodiments are provided to help understand the features and structures of the present invention.

Figure 1:
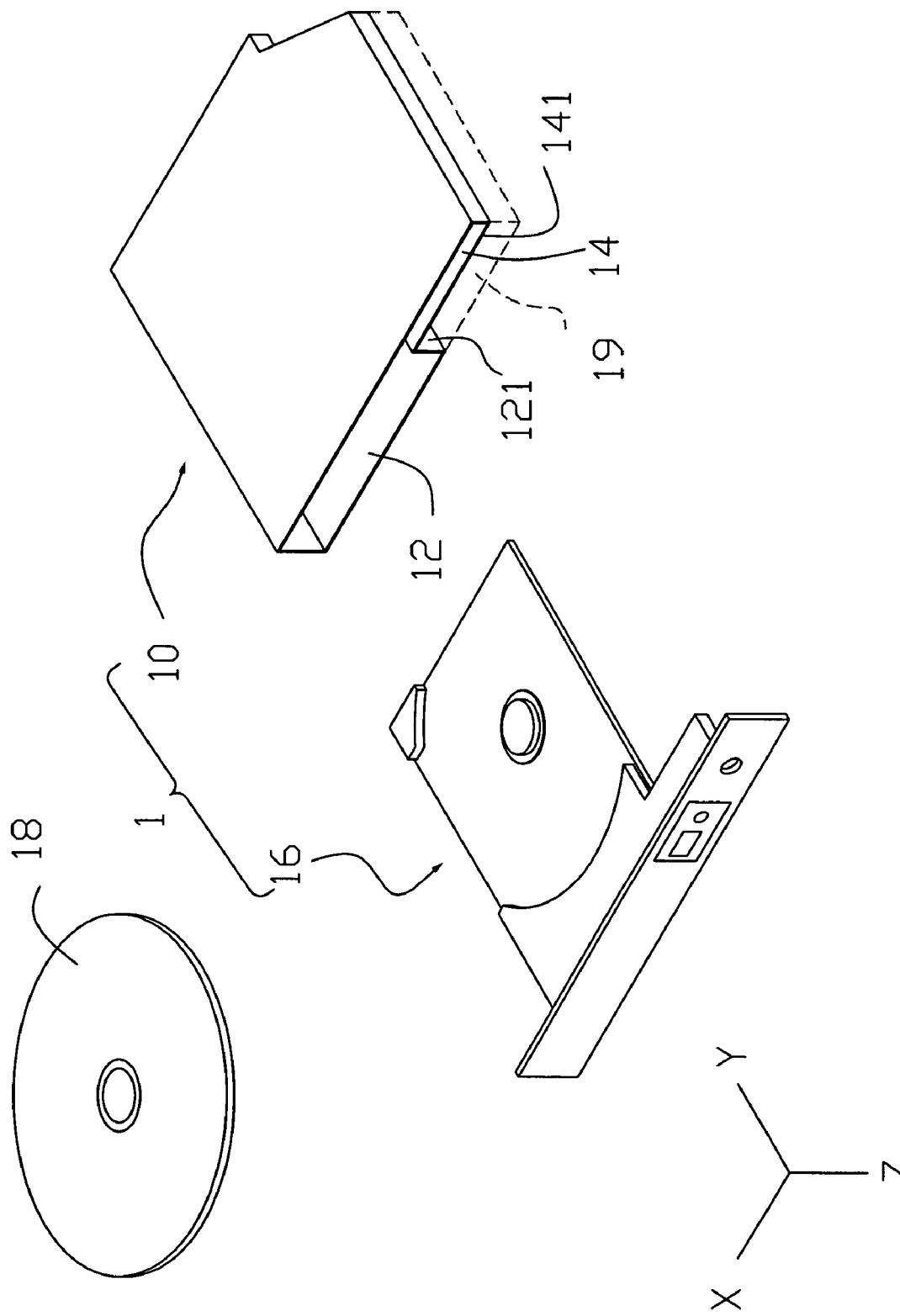
FIG. 1 is a schematic drawing of a conventional digital video device.
Figure 2A:
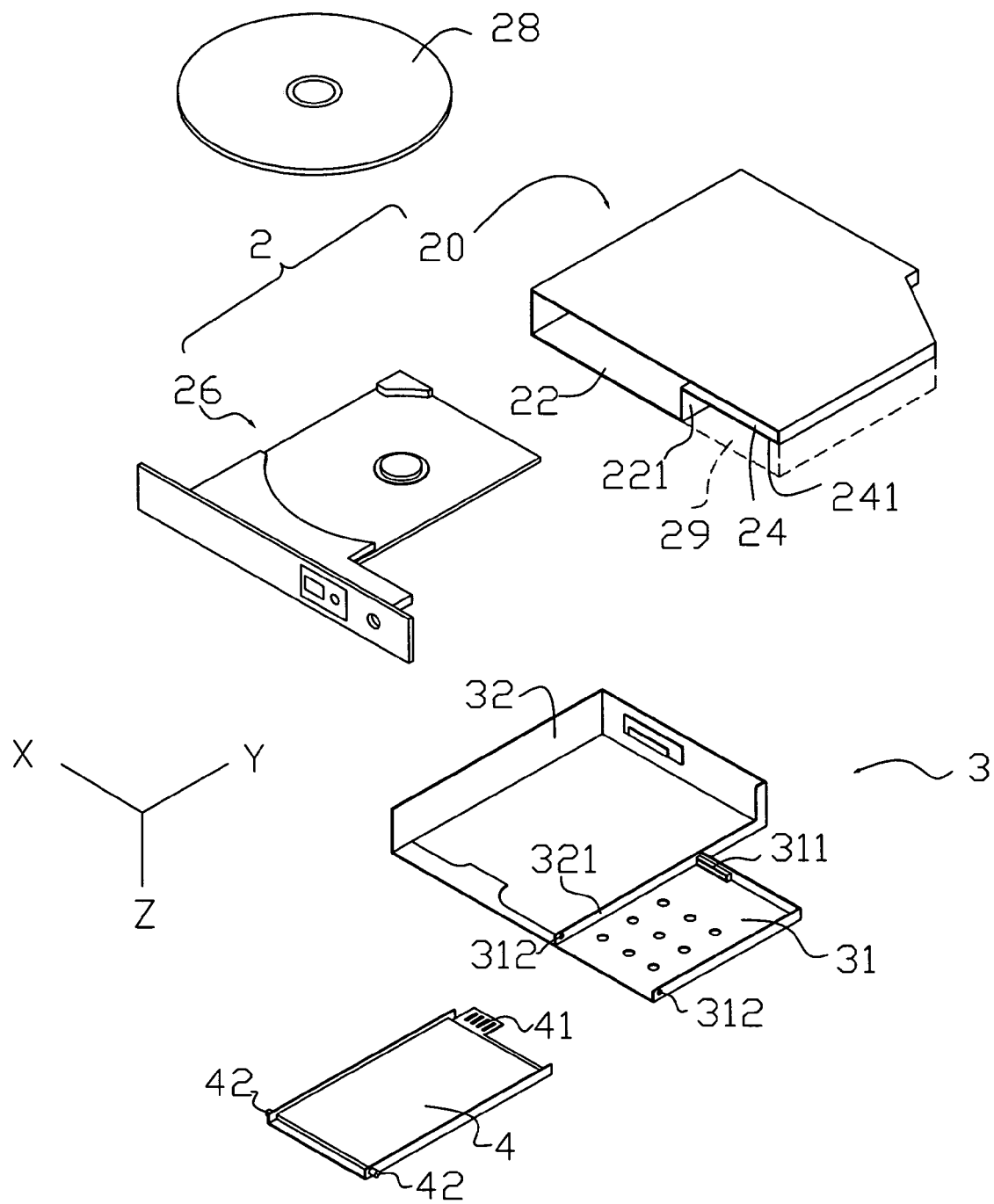
FIG. 2A is an exploded view of a digital video device having an expansion socket according to the present invention, where the expansion socket is located under the digital video device.

Please refer to FIG. 2A, which shows one embodiment of the present invention. A housing 20 of a digital video device 2 comprises a disk tray area 22 and a disk area 24. A disk tray 26 may be placed in the disk tray area 22, and a disk 28 may revolve within the disk area 24. The disk area 24 is located above the disk tray area 22, and a cross section of the disk area 24 is larger than that of the disk tray area 22 (with reference to the X-Y plane according to the coordinate axis). Thus, comparing the disk area 24 with the disk tray area 22, a larger portion 241 and a side 221 of the disk tray area 22 form an expansion space 29.

An expansion socket 3 is located under the digital video device 2 according to the present invention. In this embodiment, the expansion socket 3 comprises a socket main body 31 and a frame 32. The frame 32 is adjacent to one side 321 of the socket main body 31 and connected to the socket main body 31. The frame 32 is used for placing the disk tray area 22 of the case 20 and to fix the expansion socket 3 and the digital video device 2.

Because the frame 32 may be adapted to surround the disk tray area 22 of the case 20, when the expansion socket 3 is combined with the digital video device 2, the socket main body 31 adjacent to the frame 32 is located in the expansion room 29 under the digital video device 2. The socket main body 31 according to the present invention is provided for an expansion module 4 to insert into. In a preferred embodiment, the socket main body 31 has at least a first fixing member 312, such as fixing slots shown in FIG. 2A. The expansion module 4 may have at least a second fixing member 42 corresponding to the first fixing members 312, such as protrusions shown in the FIG. 2A. Accordingly, when the expansion module 4 is inserted into the socket main body 31, the first fixing members 312 and second fixing members 42 are engaged, such that the expansion module 4 is fixed in the socket main body 31. Alternatively, as known by those skilled in the art, the first fixing members may be protrusions and the second fixing members may be slots (not shown) to fix the expansion module 4 in the socket main body 31. Furthermore, the first fixing members and the second fixing members may also be some other means that engage with each other, such as by the use of tracks, solder, or even adhesives, etc.

Figure 2B:
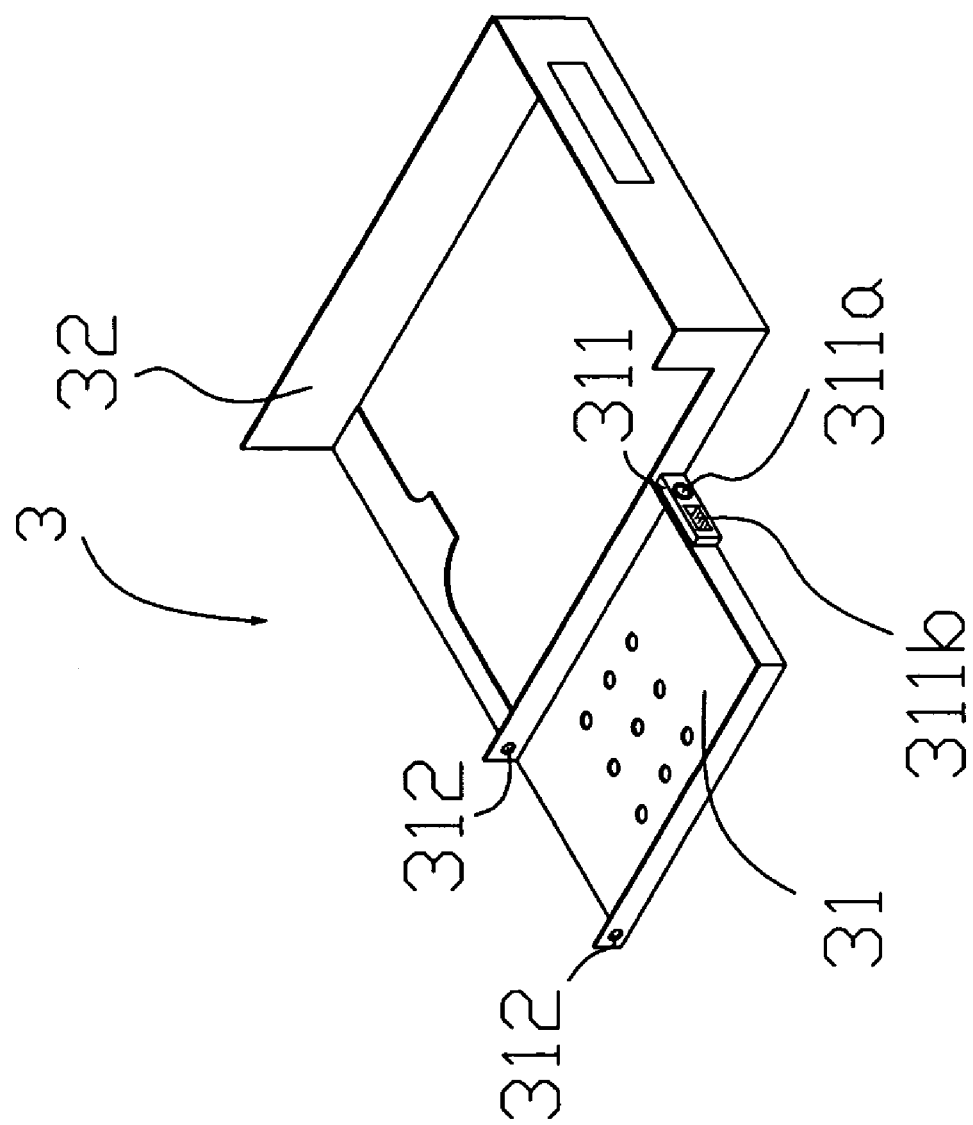
FIG. 2B is a perspective view of the digital video device of FIG. 2A.

In addition, the socket main body 31 further comprises a connector 311 for a module connector 41 of the expansion module 4 to insert into for electronically connecting the expansion module 4 and the socket main body 31. In a preferred embodiment, referring to the FIG. 2B, the connector 311 may have an antenna interface 311a. The connector 311 may also have a USB interface 311b. Or, the connector 311 may comprise an IEEE 1394 interface connector, a PCI interface connector, and/or a PCI express interface.

Figure 3:
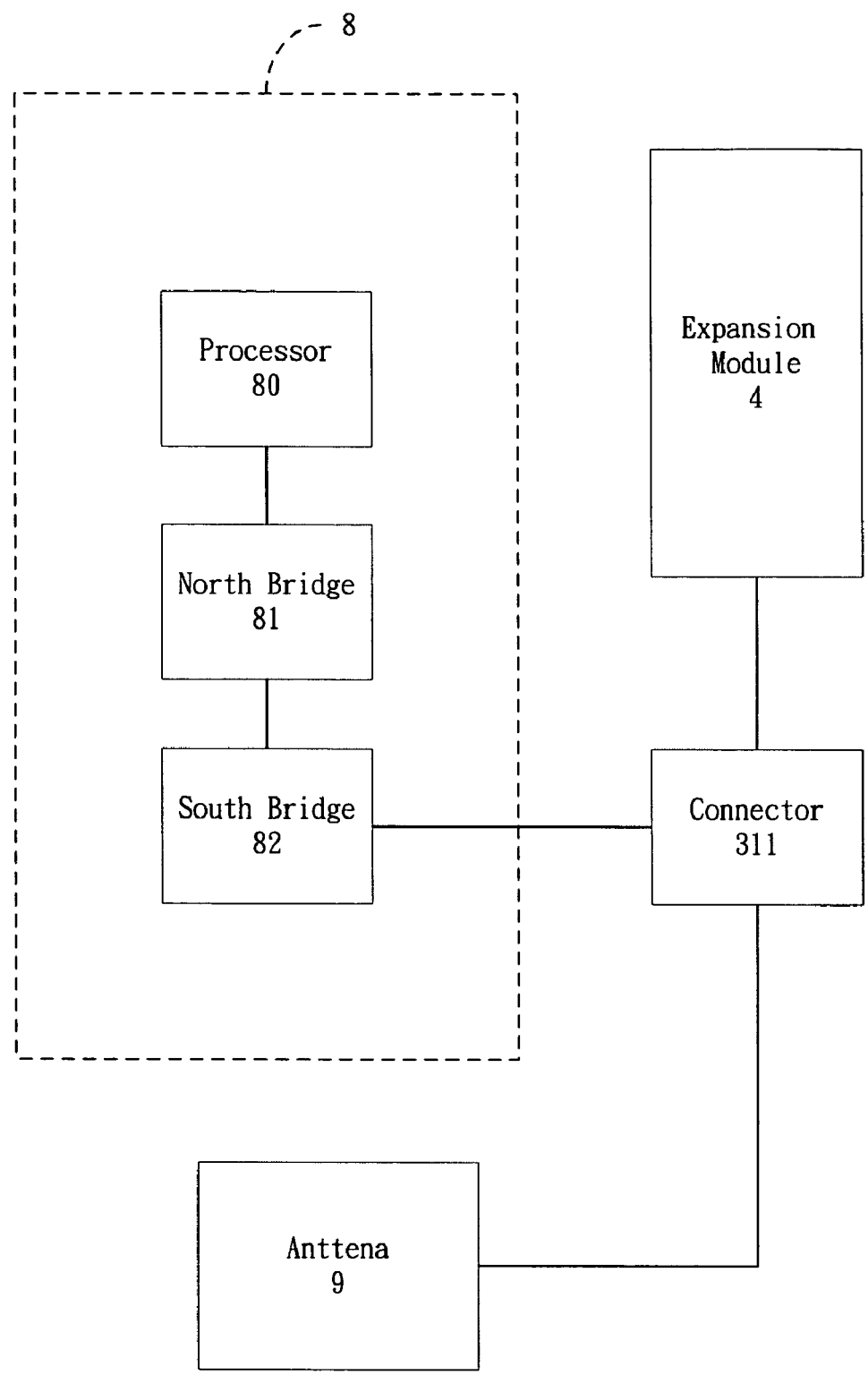
FIG. 3 is a block diagram of an expansion module and a laptop computer wherein the expansion module is inserted into an expansion socket of the digital video device according to the present invention.

Accordingly, the expansion module 4 may have an antenna interface corresponding to the connector 311 of the socket main body 31. An antenna 9, referring to FIG. 3, may be set on a laptop computer (not shown). Thus, when the expansion module 4 is inserted into the socket main body 31, and the expansion socket 3 is set under the digital video device 2, the connector 311 electronically connects to the antenna 9 for receiving antenna signals. Similarly, the expansion module 4 may comprise a USB interface, an IEEE 1394 interface, a PCI interface, and/or a PCI Express interface. Therefore, the expansion module 4 may be electronically connected to a south bridge 82 of a motherboard 8 in the laptop computer through the connector 311 of the socket main body 31, wherein the motherboard 8 further comprises a north bridge 81 and a processor 80 for processing.

In a preferred embodiment, the expansion socket 3 of the present invention may be adapted to provide additional functionality for the laptop computer. For example, the expansion module 4 may be a digital TV tuner module, a General Packet Radio Service (GPRS) module, a Global Positioning System (GPS) module, a wireless Local Area Network (LAN) module, or a Bluetooth module.

As shown in FIG. 2A, the socket main body 31 may be fixed without the frame 32. In another embodiment, referring to FIG. 4, the expansion socket 5 uses fixing members 61 and 62 to fix the socket main body 50 under the larger portion 241 of the disc area 24, which is located in the expansion space 29 as defined and shown in FIG. 2A. Though the fixing members 61 and 62 in FIG. 4 illustrate tracks and rails to provide connection, this should not be taken as limiting the present invention, for as known by those skilled in the art, the fixing members may be screws and holes, wedges and fillisters, slots, solder, and/or adhesives.

The socket main body 50 may be adapted for the expansion module 4 to insert into. As in FIG. 2A, in a preferred embodiment, the socket main body 50 comprises at least a first fixing member 512, such as fixing slots shown in FIG. 4. The expansion module 4 may have at least a second fixing member 42 corresponding to the first fixing members 512, such as protrusions shown in the FIG. 4. Accordingly, when the expansion module 4 is inserted into the socket main body 50, the first fixing members 512 and second fixing members 42 engage, such that the expansion module 4 to be fixed in the socket main body 50. Alternatively, as known by those skilled in the art, the first fixing members may be protrusions, and the second fixing members may be slots (not shown) to fix the expansion module 4 in the socket main body 50. The first fixing members and the second fixing members may also be some other means that engage with each other, such as by the use of tracks, solders, or even adhesives, etc (not shown).

In an embodiment, the socket main body 50 may comprise a housing 51, when the expansion module 4 is inserted into the socket main body 50, the housing 51 substantially covers the expansion module 4. Similarly, the socket main body 50 may further comprise a connector 311 for the module connector 41 of the expansion module 4 to be inserted into for electronically connecting the expansion module 4 with the socket main body 50. In a preferred embodiment, referring to the FIG. 4, the connector 311 may have an antenna interface 311a. The connector 311 may also have a USB interface 311b. Or, the connector 311 may comprise an IEEE 1394 interface, a PCI interface, and/or a PCI express interface.

Figure 4:
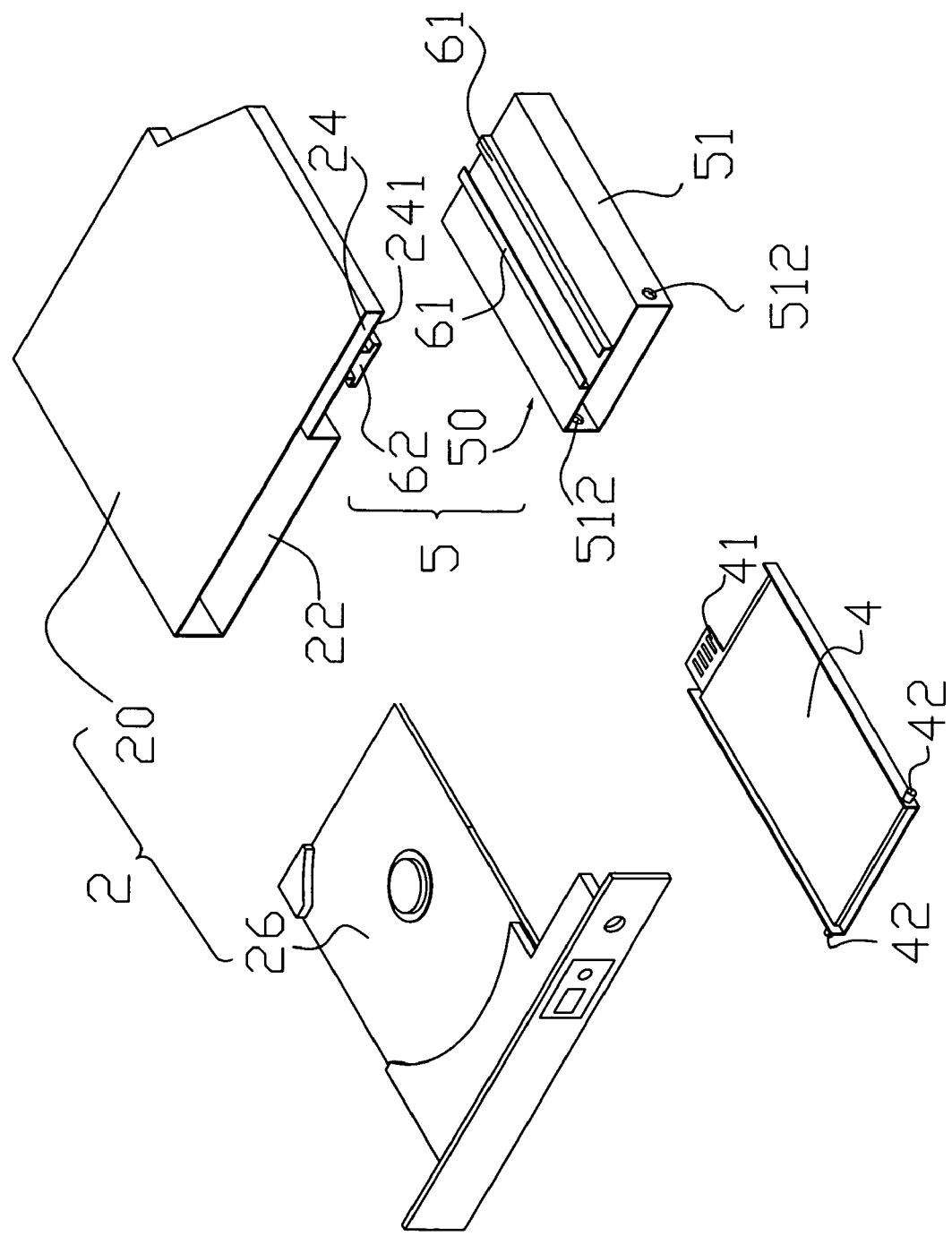
FIG. 4 is an exploded view of another embodiment of a digital video device having an expansion socket according to the present invention, where the expansion socket is located under the digital video device.

According to the embodiment in FIG. 4, the expansion socket 5 of the present invention may be adapted to provide expanded functionality for the laptop computer. For example, the expansion module 4 may be a digital TV tuner module, a GPRS module, a GPS module, a wireless LAN module, or a Bluetooth module.

Figure 5:
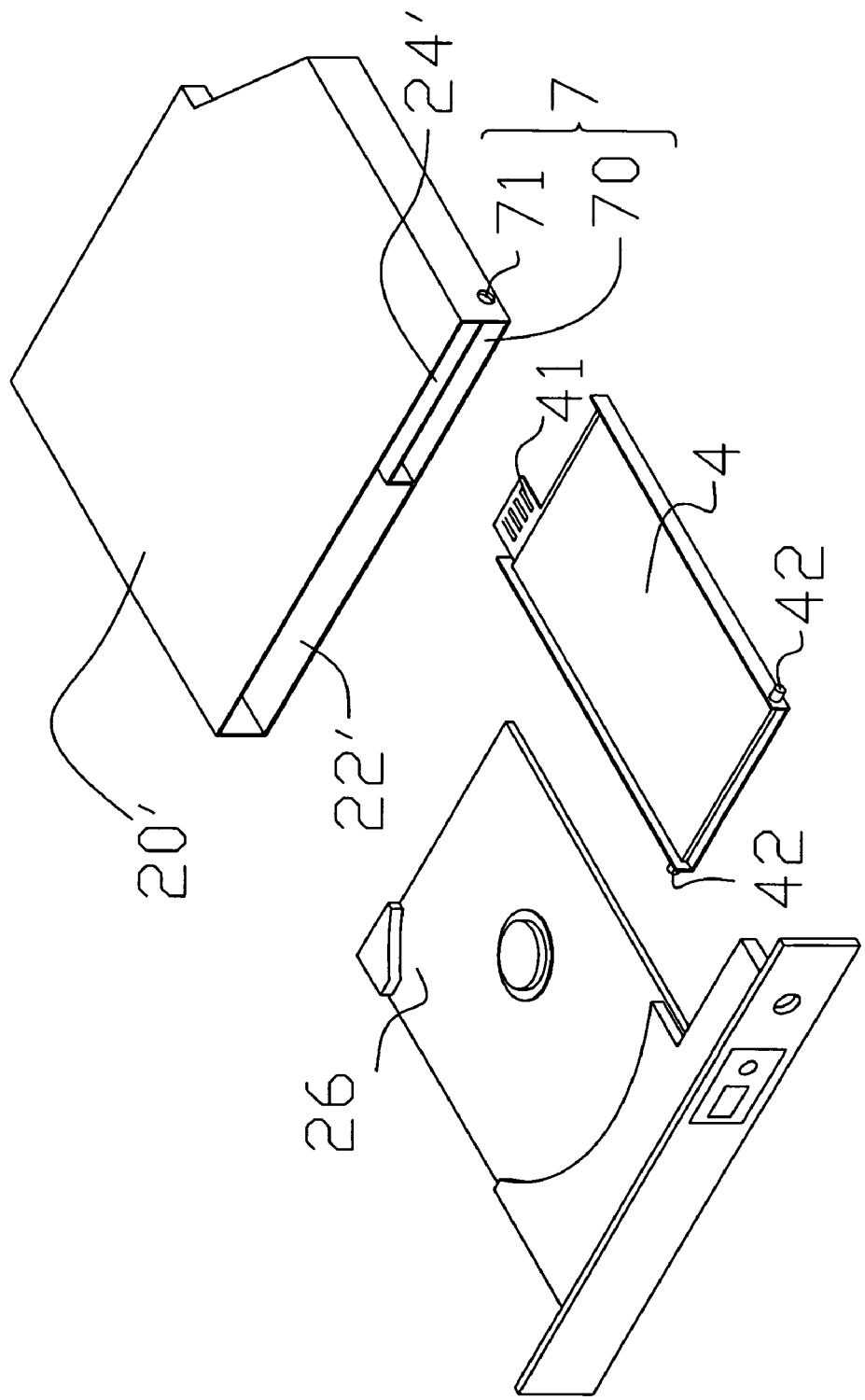
FIG. 5 is a perspective view of a third embodiment of a digital video device having an expansion socket according to the present invention, where the expansion socket and a housing of the digital video device are a single, monolithic piece.

Please refer to FIG. 5, which shows the third embodiment of the present invention. An expansion socket 7 has a socket main body 70; in particular, the socket main body 70 and the case 20' are a single, monolithic piece, such that the socket main body 70 and the case 20' form a box-like shape. Thus, the socket main body 70 can be located in the expansion space 29.

Similarly, the socket main body 70 may be adapted so that the expansion module 4 inserts into the socket main body 70. Similar to the embodiment depicted in FIG. 2A, in a preferred embodiment, the socket main body 70 comprises at least a first fixing member 71, such as fixing slots shown in FIG. 5. The expansion module 4 may have at least a second fixing member 42 corresponding to the first fixing member 71, such as protrusions shown in the FIG. 5. Accordingly, when the expansion module 4 is inserted into the socket main body 70, the first fixing members 71 and second fixed members 42 will engage with each other, such that the expansion module 4 is fixed in the socket main body 70. Alternatively, as known by those skilled in the art, the first fixing members may be protrusions and the second fixing members may be slots (not shown) to fix the expansion module 4 in the socket main body 70. Furthermore, the first fixing members and the second fixing members may also employ some other means to engage with each other, such as by the use of tracks, solders, adhesives, etc.

Similarly, the socket main body 70 may further comprise a connector 311 for the module connector 41 of the expansion module 4 to be inserted into to electronically connect the expansion module 4 with the socket main body 70. In a preferred embodiment, the connector 311 may have an antenna interface 311a. The connector 311 may also have a USB interface 311b. Or, the connector 311 may comprise an IEEE 1394 interface, a PCI interface, and/or a PCI express interface.

According to the embodiment in FIG. 5, the expansion socket 7 of the present invention may be adapted to expand the functionality of the laptop computer. For example, the expansion module 4 may be a digital TV tuner module, a GPRS module, a GPS module, a wireless LAN module, or a Bluetooth module.

The present invention uses the expansion space 29 defined by the housing 20 to create the expansion sockets 3, 5, or 7. Thus, when the laptop computer incorporates the digital video device 2, the laptop computer may have the expansion space 29 to provide the expansion socket 3, 5, or 7 for expansion functions. It may reduce the costs of extra cards for users. In addition, it may provide more flexibility for different users by providing different modules with different functions.

Although the present invention has been explained in relation to its preferred embodiment, it is to be understood that many other possible modifications and variations can be made without departing from the spirit and scope of the invention as hereinafter claimed.

What is claimed is:

1. An expansion socket for a digital video device having a housing, wherein the expansion socket is adapted to accept insertion of an expansion module, the housing of the digital video device comprising a disk tray area and a disk area above the disk tray area, wherein a plane of the disk area is larger than the disk tray area so as to form an expansion space defined by the larger portion of the plane of the disk area and a side of the disk tray area, the expansion socket comprising:
    a socket main body located in the expansion space, wherein the socket main body comprises a connector for connecting the expansion module and the socket main body; and
    a frame adjoining to a side of the socket main body, wherein the disk tray area of the housing may be placed in the frame.

2. The expansion socket of claim 1, wherein the connector comprises an antenna interface.

3. The expansion socket of claim 1, wherein the connector comprises a USB interface, an IEEE 1394 interface, a PCI interface, or a PCI Express interface.

4. The expansion socket of claim 1, wherein the expansion module is selected from a set consisting of: a digital TV tuner module; a general packet radio service module; a global positioning system module; a wireless local area network module; and a Bluetooth module.

5. The expansion socket of claim 1, wherein the socket main body comprises at least a first fixing member, and the expansion module comprises at least a second fixing member corresponding to at least the first fixing member, and when the expansion module is inserted into the expansion socket, the expansion module is fixed in the socket main body by the first fixing member engaging with the at least second fixing member.

6. An expansion socket for a digital video device having a housing, wherein the expansion socket is adapted to accept insertion of an expansion module, the housing of the digital video device comprising a disk tray area and a disk area above the disk tray area, wherein a plane of the disk area is larger than the disk tray area so as to form an expansion space defined by the larger portion of the plane of the disk area and a side of the disk tray area, the expansion socket comprising:
    a socket main body having a socket housing located in the expansion space, wherein the socket main body comprises a connector for connecting the expansion module and the socket main body; and
    at least a fixing member for connecting the socket case of the socket main body and the case of the digital video device and thereby fixing the socket main body in the expansion space.

7. The expansion socket of claim 6, wherein the at least fixing member is selected from a set consisting of: at least a screw; a track; a wedge and fillister; solder; and an adhesive.

8. The expansion socket of claim 6, wherein the connector comprises an antenna interface.

9. The expansion socket of claim 6, wherein the connector comprises a USB interface, an IEEE 1394 interface, a PCI interface, or a PCI Express interface.

10. The expansion socket of claim 6, wherein the expansion module is selected from a set consisting of: a digital TV tuner module; a general packet radio service module; a global positioning system module; a wireless local area network module; and a Bluetooth module.

11. The expansion socket of claim 6, wherein the socket housing of the socket main body comprises at least a first fixing member, and the expansion module comprises at least a second fixing member corresponding to the at least first fixing member, and when the expansion module is inserted into the expansion socket, the expansion module is fixed in the socket main body by the at least first fixing member engaging with the at least second fixing member.

12. An expansion socket for a digital video device having a housing, wherein the expansion socket is adapted to accept insertion of an expansion module, the housing of the digital video device comprising a disk tray area and a disk area above the disk tray area, wherein a plane of the disk area is larger than the disk tray area so as to form an expansion space defined by the larger portion of the plane of the disk area and a side of the disk tray area, the expansion socket comprising:
    a socket main body located in the expansion space, the socket main body and the housing of the digital video device monolithically formed, wherein the socket main body comprises a connector for connecting the expansion module and the socket main body.

13. The expansion socket of claim 12, wherein the connector comprises an antenna interface.

14. The expansion socket of claim 12, wherein the connector comprises a USB interface, an IEEE 1394 interface, a PCI interface, or a PCI Express interface.

15. The expansion socket of claim 12, wherein the expansion module is selected from a set consisting of: a digital TV tuner module; a general packet radio service module; a global positioning system module; a wireless local area network module; and a Bluetooth module.

16. The expansion socket of claim 12, wherein the socket main body comprises at least a first fixing member, and the expansion module comprises at least a second fixing member corresponding to the at least first fixing member, and when the expansion module is inserted into the expansion socket, the expansion module is fixed in the socket main body by the at least first fixing member engaging with the at least second fixing member.

* * * * *